May 5, 1953
R. S. JACOBSEN
2,637,437
SPIRAL VIBRATING CONVEYER
Filed April 5, 1948
2 SHEETS—SHEET 1
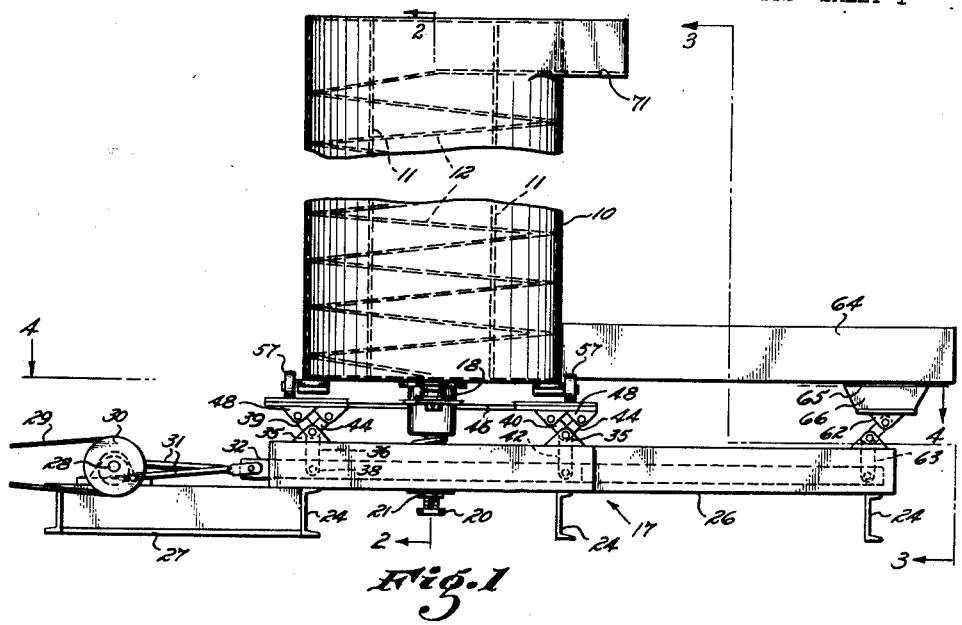
Fig.1
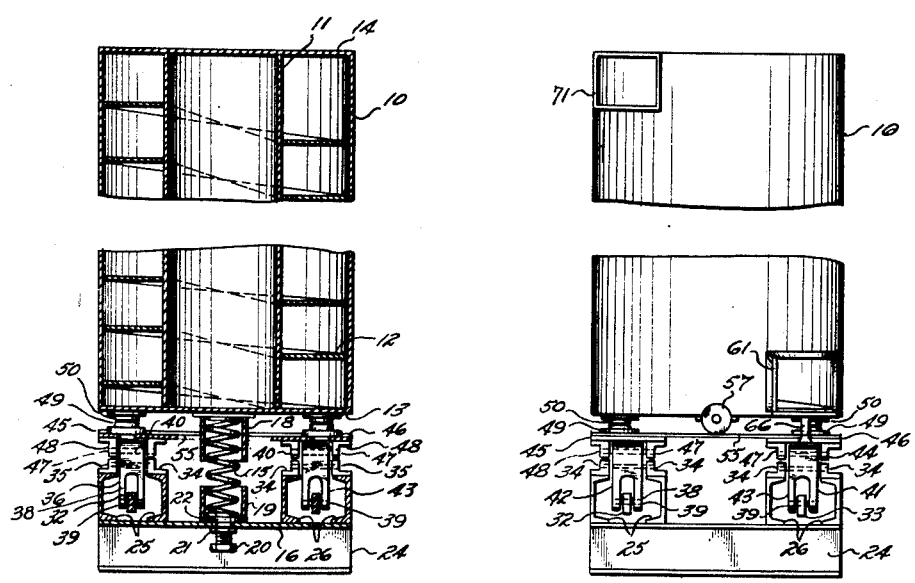
Fig.2
Fig.3
INVENTOR.
RICHARD S. JACOBSEN
BY
ATTORNEY May 5, 1953             R. S. JACOBSEN             2,637,437
SPIRAL VIBRATING CONVEYER Filed April 5, 1948             2 SHEETS—SHEET 2

INVENTOR.
RICHARD S. JACOBSEN
BY
ATTORNEY

Patented May 5, 1953

2,637,437

UNITED STATES PATENT OFFICE 2,637,437

SPIRAL VIBRATING CONVEYER

Richard S. Jacobsen, Los Angeles, Calif.

Application April 5, 1948, Serial No. 19,003

6 Claims. (Cl. 198—220)

This invention relates to power driven conveyors, and more particularly to oscillating vibratory conveyors of the type that impart movement to material by tossing the materials and are thereby able to advance the material along the conveyor surface, even on an upward grade, and has for an object the provision of a conveyor apparatus which will elevate material from one level to a higher level with economy of space.

The general principles governing the operation of oscillating vibratory conveyors are well known in the art and have been expounded with reference to certain forms of vibratory apparatus in Patent No. 2,123,189 issued to me on July 12, 1938, and it is a further object of my present invention to provide improved conveyor structure in which these principles are applied to cause curvilinear movement of the conveyed material.

A more detailed object of the invention is the provision of oscillating vibratory conveyor apparatus having the form of an ascending spiral in which the conveyed material is constrained to follow a spiral path which may lead with economy of floor space to a point directly above the point of entry of the material to the conveyor.

Another object of the invention is to provide elevating conveyor apparatus which not only lifts the conveyed material, but makes possible the discharge of the material at any desired angle to its path of entry.

A further object of the invention is the provision of conveyor apparatus of the oscillating vibratory type capable of lifting conveyed material from one level to another with less structural weight of conveyor than has been heretofore possible, and therefore with economy of power.

Yet another object of the invention is to provide in a lifting conveyor means for compensating for the weight of the conveyor apparatus and of the conveyed material, thereby effecting further economy of power.

Still another object of the invention is to provide an oscillatory lifting and rotating conveyor which may be connected to a straight line conveyor and driven from the same source of power and by the same type of power transmission apparatus by means of linkage suitable for converting arcuate movement in a vertical plane to arcuate movement in both horizontal and vertical planes.

Other objects and valuable features of the invention will be set forth or will become apparent as the description of the preferred embodiment of my invention, illustrated in the accompanying drawings, proceeds. It is to be understood that I do not limit myself to the showing made by the said drawings and description, as I may adopt variations of the preferred embodiment within the scope of my invention as defined by the claims.

Figure 1 is a side elevational view of an elevating conveyor embodying the principles of the present invention, concealed portions of the vibrating apparatus and of the spiral pathway being shown in broken lines.

Figure 2 is a medial vertical section view, the plane of section being indicated by the line 2—2 of Figure 1, with the direction of view as indicated.

Figure 3 is a compound, vertical sectional view, the planes of section being indicated by the lines 3—3 of Figure 1, with the direction of view as indicated by the arrows 3—3.

Figure 4:
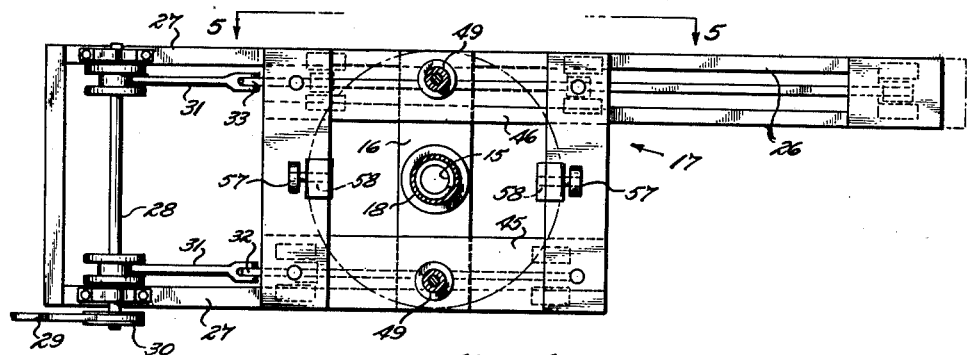
Figure 4 is a horizontal sectional view, the plane of section being indicated by the line 4—4 of Figure 1, with the direction of view as indicated.
Figure 5:
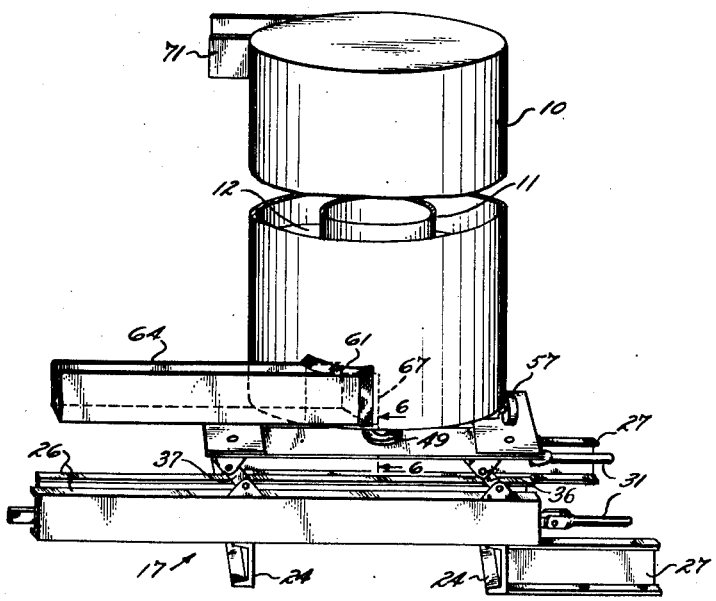
Figure 5 is a fragmentary perspective view taken from the side opposite to that shown in Figure 1, the cylindrical enclosure of the conveying apparatus being partly broken away to show interior details of construction.

Specifically describing that embodiment of my invention which has been chosen for illustration and description herein, my elevating conveyor comprises a cylindrical barrel 10 containing a concentric internal cylinder 11 and a spiral conveyor flight 12. The barrel 10 and cylinder 11 serve as side walls for the conveyor flight 12, forming therewith in effect a trough which begins at the lower barrel head 13 and ends at a point below the upper barrel head 14.

The above described structure is in part supported by a spring 15 which is mounted between the lower barrel head 13 and a crossbar 16 which forms part of the supporting frame 17. A reinforcing and guiding collar 18 is secured to the lower barrel head 13, and a second collar 19 is mounted on the crossbar 16, for containing and guiding the ends of the spring 15. The collars 18 and 19 are spaced apart, as shown in Figure 2, to permit compression of the spring 15. An adjusting screw 20 extends through a nut 21 on the crossbar 16, and through the crossbar, to bear against a disc 22 in the collar 19 and so to regulate the tension on the spring 15.

The frame 17 may comprise a plurality of channel irons 24 as transverse bases upon which are supported longitudinally extending pairs of channel irons 25 and 26 disposed beneath the barrel 10 and on opposite sides thereof. The crossbar 16 is disposed transversely between the pairs of channel irons 25 and 26 and diametrically of the barrel 10. Additional channel irons 27, extending longitudinally at the level of the base irons 24, support a transverse crank shaft 28 driven by any suitable source of power (not shown) through media such as a belt 29 and pulley 30. The crank shaft 28 drives a pair of connecting rods 31 to cause reciprocation of actuator bars 32 and 33. The pairs of channel irons 25 and 26 serve, respectively, as protective covers for the actuator bars 32 and 33, but do not guide them, as it will be seen that the actuator bars swing upwardly and downwardly as well as having longitudinal movement.

Journal boxes 34 are secured to the channel irons 25 and 26 in associated pairs, each of which is provided with a pin 35. Each of the pairs of channel irons supports one pair of journal boxes 34 on one side of the transverse axis of the barrel 10 defined by the crossbar 16, and another pair of journal boxes on the other side of said transverse axis. Bell cranks 36 and 37 are pivotally mounted on the pins 35 in the journal boxes 34 secured to the channel irons 25 and have bifurcated lower or proximal ends 38 pivotally secured by pins 39 to the actuating bar 32 and their upper or distal ends 40 inclined at moderate angles which preferably are of approximately forty-five degrees (45°) from the horizontal.

Similarly, the journal boxes 34 and pins 35 secured to the channel irons 26 support pivotally an associated pair of bell cranks 41 and 42, having their bifurcated lower ends 43 pivotally secured to the actuating bar 33 by pins 39 and their upper ends 44 inclined to their lower ends at like angles but in the opposite direction. The arrangement of the bell cranks 36, 37, 41, and 42 with respect to the crank shaft 28 is such that the upper ends 40 and 44 respective to the associated pairs of bell cranks are moved simultaneously towards the vertical but in opposite directions and simultaneously towards the horizontal but in opposite directions by rotation of the crank shaft.

The bell cranks 36 and 37 support a plate 45, and the bell cranks 41 and 42 similarly support a plate 46, each of the plates being elongated in shape to form a bridge between the associated bell cranks respective thereto and being connected to the bell cranks by pivot pins 47 mounted in journal boxes 48. Oscillation of the bell cranks by the crank shaft 28, connecting rods 31 and actuating bars 32 and 33, causes the plates 45 and 46 to move arcuately in like vertical directions and in opposite longitudinal directions, with the movement of each plate taking place substantially in a vertical plane and each plate remaining substantially horizontal during the movement. Secured to the upper side of each of the plates 45 and 46, and disposed so as to be substantially transversely opposite to each other at midstroke of the plates, are collars 49. Complementary collars 50 (see Figure 6) are secured to the lower barrel head 13 and have pivot pins 51 secured in them by pins 52. The pivot pins 51 extend through the collars 49 and the plates 45 and 46, and are held in such positions by pins 53 which engage the under surfaces of the plates.

It will be seen that the pivot pins 51 are held against rotation in the collars 50 by the pins 52, but may rotate in the collars 49 and plates 45 and 46. It is also apparent that each pin 51 is prevented from being pulled out of either of its associated collars 49, 50 by its associated locking pins 52 and 53, and that, accordingly, the vertical pins 51 serve as linkage means, effectually restraining the barrel 10 from being elevated through any substantial distance off its supporting mechanism.

The above described arcuate movement of the plates 45 and 46 results in arcuate movement of the pivot pins 51, and therefore of the spiral conveyor flight 12, in a path which is the resultant of arcuate movement in both vertical and horizontal planes. Such a path may be inscribed on a cylindrical surface by projecting thereon the arcuate path of one of the pivot pins 51 in a vertical plane tangent to the cylindrical surface at the mean point of the path. Actually, the pivot pins do not move in vertical planes, but as their rotation around the axis of the barrel 10 is only a matter of a few degrees, their horizontal divergence from vertical planes tangent to the mean points of their paths is very slight and may easily be accommodated by side slippage of the plates 45 and 46 upon the pins 47, and by movement of the pivot pins 51 within the collars 49 and 50. For example, if the pivot pins 51 move through horizontal arcs of two inches length on a radius of twenty inches, they would diverge horizontally from the tangent at the mid-point of such arcs by a matter of only about five one-hundredths of an inch, an amount which the sum of normal play in the three above-named mechanical connections would be expected to exceed.

Figure 6:
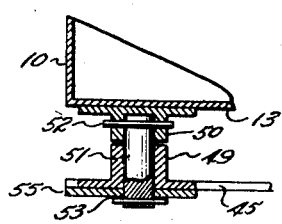
Figure 6 is a fragmentary vertical section on an enlarged scale, illustrating means for connecting the driving mechanism to the conveying mechanism, the plane of section being indicated by the line 6—6 of Figure 5, with the direction of view as indicated.

The pins 52 and 53 do not hold the collars 49 and 50 in constant abutment but permit a slight amount of relative vertical movement, nevertheless causing the collars to serve as thrust bearings against each other when contact is achieved. The upward thrust of the spring 15 is ordinarily sufficient, or may be made so by use of the tensioning bolt 20, to lift the barrel 10 when empty or only partly loaded with conveyed material, so that the collars 49 and 50 are slightly separated, as shown in Figure 6, and the barrel is then supported on the spring and not on the plates 45 and 46. When the conveyor is in operation and the spiral flight 12 carries a load of material, the collars 49 and 50 serve as thrust bearings to support the load in excess of what the spring 15 will support, and the pins 53 are out of engagement with the plates 45 and 46 and therefore provide no frictional resistance to rotative movement of the pivot pins 51.

The collars 49 and 50 provide stability for the barrel 10 transversely of the frame 17, but it is also desirable to provide stability longitudinally of the frame and in a manner that will not restrict vertical and rotative oscillation of the barrel. To effect the desired stability, transverse plates 55 are pivotally secured to the ends of the plates 45 and 46 by pivot pins 56, so as to form a parallelogram which may assume rhomboidal form. Wheels 57 are mounted on the barrel 10 with their axles 58 preferably aligned on a diameter of the barrel perpendicular to the diameter passing through the collars 50 and extending outwardly beyond the periphery of the barrel to provide a broad stabilizing base when the wheels are in contact with the plates 55. When the conveyor is empty, the wheels 57 may be just raised from the plates 55 by the lifting force of the spring 15. It will be understood that in its empty condition the barrel 10 may tilt slightly so as to have three-point support upon the spring 15, one of the collars 49 and one of the transverse plates 55.

The arrangement of the bell cranks 36, 37, 41 and 42 may be such as to cause the lifting arcuate motion imparted to the pivot pins 51 and thence to the spiral conveyor flight 12 to be in either clockwise or counter-clockwise direction, the particular construction herein illustrated being such as to impart upward counter-clockwise movement to the flight 12, as viewed in plan. The flight 12 is therefore arranged to ascend spirally in a counter-clockwise direction within the barrel 10 so that the oscillating movement of the flight is simultaneously upward and in the direction of ascent of the flight, and simultaneously downward and in the direction of descent of the flight.

To feed material to the conveyor trough formed by the barrel structure and the spiral conveyor flight, the barrel 10 is provided with an opening 61 admitting to the lower end of the trough. The flight 12 is arranged preferably to have its lower termination directed parallel to the longitudinal axis of the frame 17, which is to say, parallel to the actuating bars 32 and 33. The actuating bars 32 and 33 are so spaced that at least one of them is in substantial alignment with, and below, a line tangential to the center line of the spiral flight 12, this bar in the embodiment illustrated being the bar 33. The bar 33 and its covering channel irons 26 are extended outwardly in longitudinal extension of the frame 17 and journal boxes 62 are affixed to the distal end of the channel irons 26. A bell crank 63, of the same form and angulation as the bell cranks 41 and 42, is pivotally mounted on the journal boxes 62 and is connected to a straight line conveyor trough 64 by means of a bracket 65 and support member 66. The straight line conveyor trough 64 has one end 67 resting slidably within the opening 61, and although it is shown as substantially horizontal in Figures 1 and 3, it may be moderately inclined either upwardly towards or downwardly towards the opening 61. The bell crank 63 will impart the same oscillating vertical and longitudinal arcuate movement to the conveyor trough 64 as the bell cranks 41 and 42 impart to the plate 46; and the barrel 10 will impart similar movement to the end of the trough 64 resting therein. The opening 61 is sufficiently wide so as not to pound the trough 64 from side to side as the barrel oscillates rotatively, but to allow the trough to slide laterally relative to the opening at the same time as it slides in and out therethrough.

An outlet from the spiral conveyor flight 12 is provided by a chute 71 which extends tangentially outward from the upper end of the flight 12 through the barrel 10. As both the height and the inclination of the flight 12 may be varied to suit circumstances, the tangential direction of the upper end of the flight may be at any desired horizontal angle to the straight line conveyor 64, and the chute 71 may accordingly lead from the barrel in any desired direction. The complete assembly of conveyor trough 64, spiral conveyor flight 12, and chute 71 may therefore be utilized not only to lift materials, but to change their horizontal course. Some horizontally arcuate movement will, of course, occur at the outer end of the chute 71 and the chute is therefore preferably relatively short so as not to require too wide a receiving element in the next successive step in a conveyor system.

In the operation of my conveyor apparatus, materials received by the straight line conveyor trough 64 are shaken forwardly and upwardly in the direction of the barrel 10 and thereby moved along the trough to enter the opening 61 and be received upon the spiral conveyor flight 12.

The spiral conveyor flight 12 also shakes the materials upwardly and in the direction of its ascending inclination, thereby moving the materials along the spiral pathway to the chute 71. The individual particles of material are not actually thrown by the forwardly rotary and upwardly oscillations of the flight 12, in the sense that they would depart from the flight in tangential directions, but rather they follow the spiral path in contact with the flight and have impressed upon them an inertia which overcomes the lesser frictional drag of the downwardly and rearwardly receding flight during the return portion of the oscillation. They thus are moved in short arcs along a substantially true spiral course, and are not noticeably retarded by mutual jostling such as would result from tangential movement, but progress freely and rapidly. Upon reaching the chute 71, the materials are thrown not only upwardly and forwardly, but also slightly from side to side, but as this part of the apparatus is normally horizontal, an accelerated forward movement offsets any loss of progress due to lateral movement and the materials are discharged from the chute substantially at the same rate as they are received thereby.

The spring 15, by upholding the weight of the barrel 10 and a portion of the normal load therein, relieves the driving mechanism of much of the driving load and permits use of lighter driving parts, as well as saving on power. When the conveyor is empty, the bell cranks pull downwardly against the unbalanced force of the spring 15. This tends to cause the collars 49 and 50 to separate and the wheels 57 to lift from the transverse plates 55. Consequently, the barrel 10 will be slightly unstable and will tend to seek a three-point support, and if in operation it will shake and indicate to the operator by increased vibration that it is empty or running at considerably less than capacity. When, however, the conveyor is loaded sufficiently to compress the spring 15 and to rest squarely on the collars 49 and 50 and the wheels 57, the bell cranks lift the load unbalanced by the spring 15, acting through the collars and wheels, and gravity assists the downward oscillating stroke. Under these circumstances, the barrel 10 is fully stabilized and is able to rise easily and also to rotate freely because of the light load on the collars and wheels.

I claim:

1. In conveyor apparatus, the combination of a spiral trough forming an ascending pathway, a straight line conveyor communicating with the lower end of said trough and in substantial alignment therewith, drive means common to said trough and to said straight line conveyor, inclusive of means supporting said trough and said straight line conveyor and oscillatingly and arcuately movable in vertical planes so that said straight line conveyor is moved thereby simultaneously upwardly and towards said trough, and pivot pins connecting said supporting means and said trough for converting the arcuate movement of said supporting means to an arcuate oscillating movement of said trough upwardly and away from said straight line conveyor, and downwardly and theretowards.

2. Conveyor apparatus comprising a trough formed spirally about a substantially vertical axis, horizontally elongated support members arranged below said trough at points on opposite sides of said axis, a pair of bell cranks supporting each of said support members and spaced longitudinally thereof and arranged to impart oscillating arcuate movement thereto in a vertical plane extending longitudinally of said member, means for actuating said pairs of bell cranks so that the movements imparted thereby to said support members are simultaneously upward and in opposite longitudinal directions, pivot pins connecting said trough to said support members to be moved thereby as said support members oscillate, and means for supporting said trough while permitting free relative rotary movement and limited relative vertical movement of said trough and said support member.

3. Conveyor apparatus as specified in claim 2, with the addition of an additional bell crank operatively connected with one of said pairs of bell cranks so as to oscillate in the same vertical plane therewith, wall means defining an inlet to the lower end of said trough, and a straight line conveyor having its one end supported by said additional bell crank and its other end resting slidably in said inlet.

4. In conveyor apparatus having a conveyor trough of the helical formation about a vertical axis and bell cranks arranged in associated pairs at opposite sides of said trough and adapted to oscillate oppositely in vertical planes to impart oscillating vertical and rotary movement to said trough, platform means supported by said bell cranks and adapted to support said trough comprising four members forming a parallelogram and pivotally joined so as to be capable of rhomboidal form, of which each of two opposed members is pivotally connected to one of said pairs of bell cranks so as to be arcuately moved thereby in a vertical plane while being maintained horizontal, bearing means on each of said two opposed members for pivotally supporting said trough thereon, and wheel means for supporting said trough on the other two opposed members.

5. A structure as specified in claim 4, with the addition of spring means adapted to relieve said platform means of the weight of said trough.

6. A structure as specified in claim 5 in which said spring means are disposed below said trough and are capable of supporting the weight of said trough when said trough is empty, and including means for preventing said spring means from raising said trough from said platform means for any substantial distance.

RICHARD S. JACOBSEN.

References Cited in the file of this patent

UNITED STATES PATENTS

| Number | Name | Date |
|---|---|---|
| 973,921 | Dodge | Oct. 25, 1910 |
| 2,123,189 | Jacobsen | July 12, 1938 |
| 2,374,664 | Carrier | May 1, 1945 |
| 2,464,216 | Devol | Mar. 15, 1949 |